Feb. 22, 1927.
S. VOYATZIS
BUMPER
Filed July 3, 1926
1,618,394
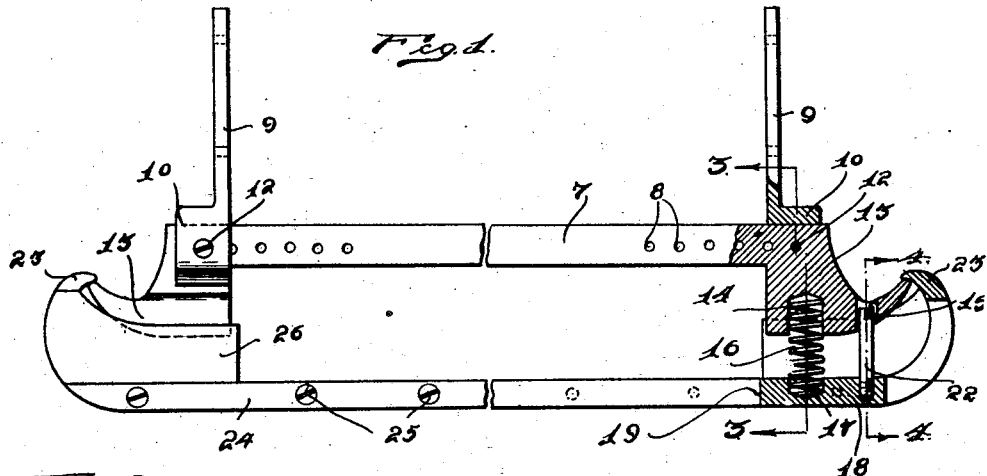
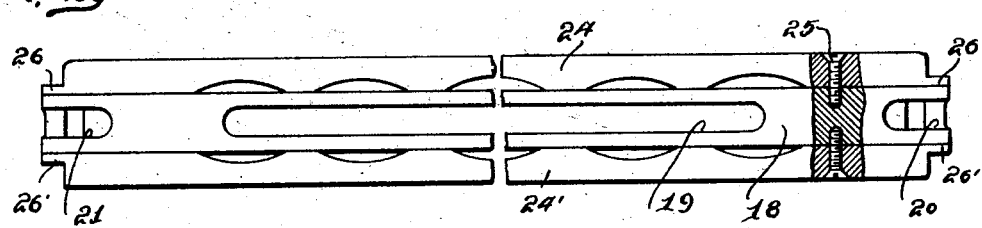
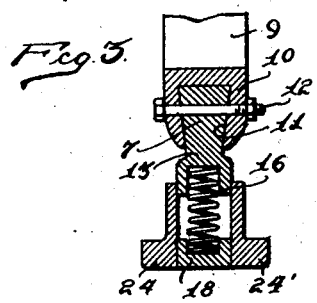
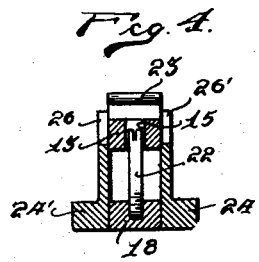
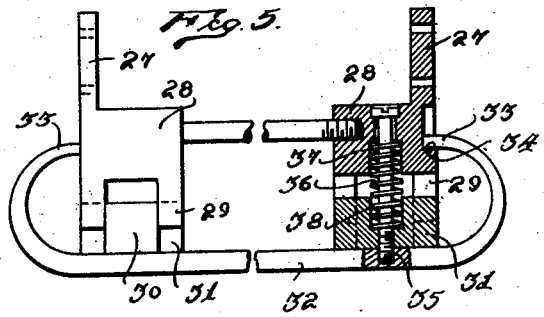
INVENTOR.
Steve Voyatzis
BY
ATTORNEY.

Patented Feb. 22, 1927.

1,618,394

UNITED STATES PATENT OFFICE.

STEVE VOYATZIS, OF DETROIT, MICHIGAN.

BUMPER.

Application filed July 3, 1926. Serial No. 120,298.

My invention relates to a new and useful improvement in a bumper adapted for use on vehicles of various kinds, and has for its object the provision of a structure which will be durable in use, easily and quickly mounted on a vehicle and at the same time economical of manufacture.

Another object of the invention is the provision of a bumper so constructed and arranged as to resist direct and angular thrusts without distortion of the various parts.

Another object of the invention is the provision of a separably movable engaging portion with resilient shock absorbing members.

Another object of the invention is the provision of a bumper of this class of a suitable mounting means for mounting the bumper on its support with which used.

Another object of the invention is the provision of a separably movable forward engaging member having means for limiting outward movement of the engaging member in response to the tension of springs positioned behind it.

Other objects will appear hereinafter.

The invention consists in the combination and arrangement of parts hereinafter described and claimed.

The invention will be best understood by a reference to the accompanying drawings which form a part of this specification and in which, Fig. 1 is a top plan view of the preferred form with parts removed and parts in section.

Fig. 2 is a fragmentary front elevational view of the preferred form with parts in section.

Fig. 3 is a fragmentary sectional view taken on substantially line 3—3 of Fig. 1.

Fig. 4 is a sectional view taken on substantially line 4—4 of Fig. 1.

Fig. 5 is a top plan view of a modified form of structure with parts removed and parts in section.

In the preferred form the bumper comprises a rearward portion embodying a longitudinally extending dovetailed bar 7 in which is formed a plurality of openings 8. Supporting arms 9 and 9', each provided with a head 10 having a dove-tailed slot 11 formed therein, is slidably mounted upon the bar 7 and moved to the desired position and secured fixed relatively to the bar 7 by means of a bolt 12 passed through the head 10 and the openings 8. A plurality of openings 8 are formed in the bar 7 so as to permit the relative movement of the supporting arms 9 and 9' to accommodate the device for mounting on the vehicle in various locations. Projecting forwardly from each end of the bar 7 is a shoe 13 having a pocket or recess 14 formed in its main body and provided with an opening 15. Positioned in the pocket 14 is one end of a coiled spring 16, the other end of which engages in a pocket 17 formed in the central member 18 of the movable engaging portion of the bumper. This central portion 18 is provided with slots 19, 20 and 21 for the purpose of reducing the weight. Fixedly mounted in this central portion and projecting rearwardly therefrom are guide studs 22, which project into the openings 15 formed in the shoes 13. The ends of this central engaging portion 18 are curved as at 23 to engage the tip of the shoes 13 so that the spring 16 is unable to move the member 17 out of co-operative relation with the supporting bar 7, the tip of the shoe engaging the inner surface of the curved portion 23. An upper cover bar 24 is secured to the central portion 18 by means of screws 25 or other suitable fastening means. Formed integral with the cover bar 24 at each side is a plate 26 which serves to cover the spring and stud 22 to form a sort of housing to protect these members from dust or other foreign material. A similar bar 24' is secured to the lower surface of the member 18 and provided with similar plates 26'.

The bumper so constructed is one which is quite efficient in use as the bumper portion comprising the cover bars 24 and 24' as well as the central portion 18 move inwardly toward the bar 7 when a pressure is exerted upon it. The spring 16 serves to restore these engaging portions to normal position after release of this pressure, the curved portion 23 limiting this outward movement. By having the openings 15 enlarged, to permit play between these openings and the studs 22, the engaging member, comprising the bars 24, 24' and the central portion 18, may be moved inwardly toward the supporting bar at only one side without any binding of the various parts.

In the modified form shown in Fig. 5 I have illustrated a slightly different adaptation of the invention in which the supporting arm 27, which is fastened to the vehicle, is provided with a head 28 having arms 29 projecting outwardly therefrom and engaging at opposite sides of a boss 30 formed on a head 31 which is fastened to a bumper bar 32, the ends of which are curved as at 33 for engaging in recesses 34 formed in the sides of the heads 28. Fastened in the bar 32 is a stud 35 which projects through the head 28, a suitable spring 36 being positioned in sockets 37 and 38 formed in the head 28 and the head 31 respectively. This arrangement is a somewhat less ornamental arrangement, while at the same time it embodies the movable bumper member and is provided with means for limiting the outward movement in response to the pressure of the spring 36.

While I have illustrated and described the preferred form of structure, I do not wish to limit myself to the precise form of structure shown, but desire to avail myself of such variations and modifications as may come within the scope of the appended claims.

Having thus described my invention what I claim as new and desire to secure by Letters Patent is:

1. A bumper of the class described comprising a supporting bar; a pair of supporting arms adjustably longitudinally thereof; means for fixing said arms in fixed relation on said bar; a shoe projecting outwardly from each end of said bar; an engaging portion movable inwardly and outwardly relatively to said shoe; a spring for normally retaining said engaging portion in outwardly moved position; a portion on said engaging portion for engaging said shoe for limiting the outward movement of said engaging portion relatively to said supporting bar.

2. A bumper of the class described comprising a supporting bar; a pair of supporting arms adjustable longitudinally thereof; means for fixing said arms in fixed relation on said bar; a shoe projecting outwardly from each end of said bar; an engaging portion movable inwardly and outwardly relatively to said shoe; a spring for normally retaining said engaging portion in outwardly moved position; a portion on said engaging portion for engaging said shoe for limiting the outward movement of said engaging portion relatively to said supporting bar, and a guide member carried by said engaging portion projecting into an opening formed in said shoe, said guide member permitting the movement of said engaging portion bodily inwardly toward said supporting bar and permitting movement of either end of said engaging portion inwardly of said supporting bar.

3. A bumper of the class described comprising a supporting bar; a shoe projecting outwardly from each end of said supporting bar; an engaging bar movable inwardly and outwardly relatively to said shoes; a pair of springs, each engaging at one end one of said shoes and at the other end the inner surface of said engaging bar for normally retaining said engaging bar in spaced relation to said shoes; and means on said engaging bar for engaging said shoes for limiting outward thrust of the same relatively to said shoes.

4. A bumper of the class described comprising a supporting bar; a shoe projecting outwardly from each end of said supporting bar; an engaging bar movable inwardly and outwardly relatively to said shoes; a pair of springs each engaging at one end one of said shoes and at the other end the inner surface of said engaging bar for normally retaining said engaging bar in spaced relation to said shoes; means on said engaging bar for engaging said shoes for limiting outward thrust of the same relatively to said shoes; and a guide stud projecting inwardly from each end of said engaging bar and passing through an opening formed in the shoe positioned opposite thereto.

5. A bumper of the class described comprising a supporting bar; a shoe projecting outwardly from each end of said supporting bar; an engaging bar movable inwardly and outwardly relatively to said shoes; a pair of springs, each engaging at one end one of said shoes and at the other end the inner surface of said engaging bar for normally retaining said engaging bar in spaced relation to said shoes; means on said engaging bar for engaging said shoes for limiting outward thrust of the same relatively to said shoes; a guide stud projecting inwardly from each end of said engaging bar and passing through an opening formed in the shoe positioned opposite thereto; cover plates carried by said engaging bar for extending above and below the space separating said shoes and said engaging bar for protecting said spring and said stud from foreign material.

In testimony whereof I have signed the foregoing.

STEVE VOYATZIS.